Figure 1:
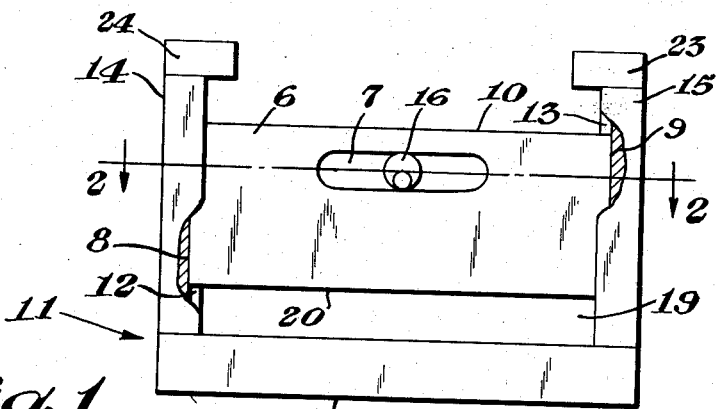

Jan. 8, 1963　　　　　J. KARPOVICH　　　　3,072,584
METHOD OF PRODUCTION OF MULTI-CELLED EXTRUDED FOAMED
POLYSTYRENE, POLYETHYLENE AND POLYPROPYLENE
Filed Dec. 21, 1959

INVENTOR.
John Karpovich
BY
Griswold & Burdick
ATTORNEYS

United States Patent Office 3,072,584
Patented Jan. 8, 1963

3,072,584
METHOD OF PRODUCTION OF MULTI-CELLED EXTRUDED FOAMED POLYSTYRENE, POLYETHYLENE AND POLYPROPYLENE
John Karpovich, Midland, Mich., assignor to The Dow Chemical Company, Midland, Mich., a corporation of Delaware
Filed Dec. 21, 1959, Ser. No. 860,830
10 Claims. (Cl. 260—2.5)

This invention relates to a process for the production of foamed thermoplastic materials. It more particularly relates to a process for nucleating foams in extruded organic polymeric materials without the use of conventional nucleating agents.

The conventional production of foamed polymeric materials, e.g., polystyrene and polyethylene, as by the extrusion of a mixture of the organic polymer with a foaming agent, results in the formation of foams having gas cells that are large and irregularly sized. This irregularity of cell or bubble size can be overcome to some extent by the addition of nucleating agents, e.g., finely divided calcium silicate hydrate, exploded mica, wood flour, carbon black, metal oxides, talc and silica gel to the foamable mixture prior to extrusion. These nucleators aid in the formation of foams having a large number of small cells or bubbles and also help to reduce somewhat wide variations of cell sizes. In the process of the present invention, now unexpectedly it has been found that extruded organic polymer foams having small cells and a narrower cell size distribution can be obtained from mixtures of a foamable material and foaming agent without the addition of nucleating agents as practiced conventionally. These foams are obtained by subjecting the material to be foamed to the action of certain stresses mechanically induced in the die expressed material as herein described.

It is the principal object of this invention to produce small-celled foams having a narrow cell size distribution range without adding foreign nucleating agents to the foamable mixture. A further object of the invention is to provide a means whereby the cell size of the foams can be controlled by varying the magnitude of the mechanically induced stresses in the extrude. An advantage of this process is that foams produced thereby have compressive strengths and flex moduli appreciably higher and a thermal conductance that is lower than conventionally prepared foams. A further advantage of this process is that selective nucleation of foams can be achieved. Still another advantage is that foams with a graded, controlled variation in cell size can be produced by the process of this invention. Another advantage of this invention is that this process can be utilized with foamable mixtures containing conventional nucleating agents to further improve the properties of foams prepared from such mixtures. Still other objects and advantages will be recognized from the process description presented hereinafter.

In practicing the process of this invention, a mixture of a foamable polymer and a gas producing foaming agent is extruded in a conventional manner through the orifice of an extruder die. After leaving the die orifice, and prior to initiation of normal foaming action, the extrude is subjected to the action of a cyclic application of a sudden deformation pressure. The so-treated extrude then is permitted to expand into foam. As a result of the cyclic application of the sudden deformation pressure, the foam thereby produced is a fine-celled foam having a substantially uniform distribution of bubbles.

Subjection of the extrude to the action of the sudden cyclic deformation pressures can be done at various times as dictated by the extrusion conditions and procedures and by the extrusion compositions themselves. For example, compositions of polystyrene with methyl chloride as a foaming agent, as conventionally entruded, undergo spontaneous foaming shortly after the extrude leaves the die orifice. In these cases, the deformation pressures are applied to the metastable gel-like or plastic extrude immediately as it leaves the die orifice and prior to the initiation of normal, spontaneous foaming. On the other hand, compositions of polystyrene containing n-pentane as a foamer can be quenched immediately after extruding and subsequently stored as a stable, non-foamed solid for indefinite periods of time before foaming. In such systems, the deformation pressures can be applied at anytime prior to the time of foaming. The deformation pressures can be induced in the extrude by a variety of means, e.g., repetitive force impacts or vigorous jarring, use of sonic oscillators, and use of ultrasonic generators having good acoustical coupling with an extruded but unfoamed gel.

The cyclic deformation pressures suddenly applied in accordance with the invention manifest themselves in the extrude as a cyclic shock wave which can range in rate from subsonic to ultrasonic, and must be of such intensity that the extrude is placed in tension sufficient to nucleate a multiplicity of bubble sites leading to the initiation of foaming.

The intensity and type of pressure function necessary to promote formation of the desired tensile stress in the extrude can vary from low frequency, subsonic impulses having large amplitudes, to high frequency ultrasonic impulses. Furthermore, the pressure function can be generated in the extrude either by alternately contacting and breaking the contact of a rapidly moving solid surface with the extrude or by keeping the oscillating source continuously in contact with the extrude gel. In order for nucleation of cells to be effective, it is necessary that good acoustical coupling be made with the extrude by the pressure function generating means.

In a specific embodiment of the process a force impact device, as shown in the drawings, is attached to the exterior of an extruder for a foamable polystyrene. This device, exemplifying one way by which force impacts can be imparted to a foamable polystyrene extrude, is a vertical rectilinear oscillator.

Figure 2:
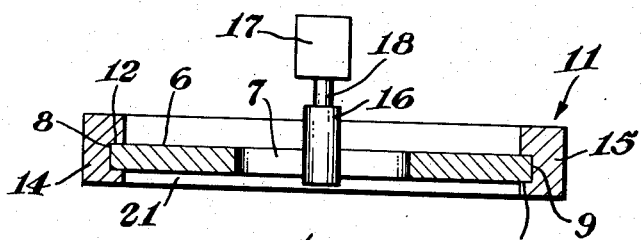
Figure 3:
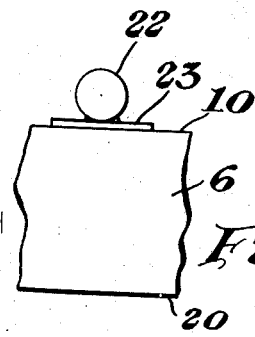
Figure 4:
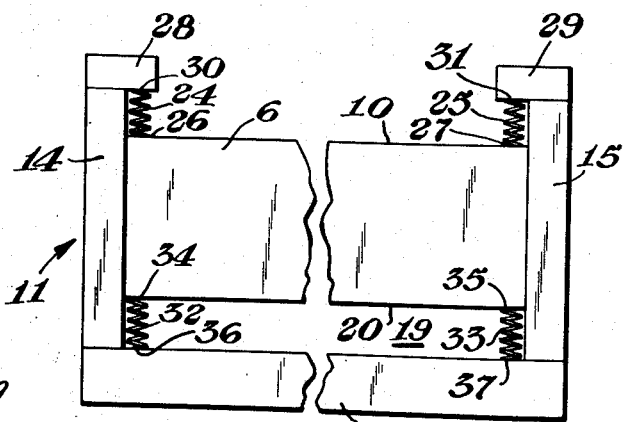
Figure 5:
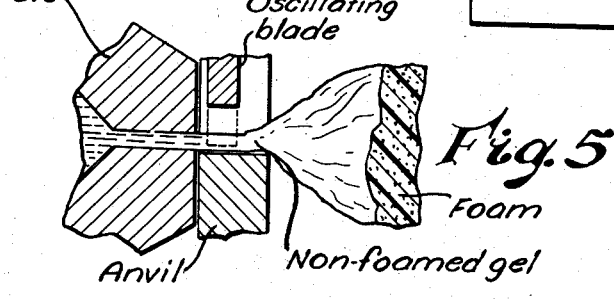

In the drawings:
FIGURE 1 is a front elevation, partially cut-away, of an eccentric shaft powered vertical rectilinear oscillator.
FIGURE 2 is a horizontal sectional view taken on the line 2—2 of FIGURE 1.
FIGURE 3 is a fragmentary view of the oscillator of FIGURE 1 wherein the oscillator is powered by a spinning eccentric weight.
FIGURE 4 is a front elevation of a modification of the oscillator of FIGURE 1 wherein the blade is spring mounted.
FIGURE 5 is a cut-away schematic drawing showing the extruder die opening, extrude gel and pressure applicator relationship.

The oscillator of FIGURE 1 has a gate or blade 6. This gate has a parallel-walled elongated horizontal opening 7 centered midway between the sides 8 and 9 of the gate and positioned near the top 10 of the gate. The gate is fitted into a substantially U-shaped supporting frame 11 in such a manner that the side edges 8 and 9 slide freely in a vertical direction within the guides 12 and 13 respectively of the arms 14 and 15 of the U-shaped frame. A conventional eccentric shaft assembly 16, so designed to fit into and slidably engage the opening 7 of the blade, is inserted into this opening. This shaft assembly is connected to a conventional power source 17 by a shaft 18.

In use, the oscillator is attached to the exterior of the extruder die in such a manner that an opening 19 formed between the bottom edge 20 of the vertically oscillating blade 6 and the bottom member, or anvil, 21 of the U-shaped blade supporting frame is directly in line with the orifice of the extruder die. A pre-mixed blend of polystyrene granules, foaming agent and die lubricant is extruded in a conventional manner. The gel-like extrude, as it leaves the die orifice, and prior to the time that normal foaming is initiated, is passed between the anvil 21 and the oscillating blade 6 of the vertical rectilinear oscillator shown in the drawings. The gel, as it passes between the anvil 21 and the blade 6 is subjected to shock impacts at a rate of about 8 cycles per second by successive contacts and withdrawals of the blade from the gel. This blade is driven up and down by rotating the eccentric shaft 16 at 480 revolutions per minute. The blade edge 20 makes and breaks contact with the moving extruded gel, but is so positioned, as shown in FIGURE 5, that it approaches the anvil in close position but at no time does it actually pass through the gel and make direct contact with the anvil. The so-treated extrude, as it moves away from the oscillator, then expands into a polystyrene foam which cools and hardens.

FIGURE 3 shows the oscillator having an alternative driving means for moving the oscillating blade 6. A conventional circular spinning eccentric weight motor 22 is attached to the top of the blade through a mounting plate 23 affixed thereto. The motor may also be composed of a spherical ball made of metal, plastic, ceramic, sapphire or other suitable hard material which is forced by compressed air, or liquid under pressure, to spin in a circular race. In so doing, oscillations are set up in the member to which the motor is attached.

Alternatively, the blade 6 can be attached to the top of the frame 11 through springs 24 and 25, each spring being welded on one end to the top of the blade near the outer edges 8 and 9 at points 26 and 27 respectively and each spring having its other end welded to the frame arms 28 and 29 respectively at points 30 and 31. The blade is also attached to the bottom member 21 of the frame 11 by springs 32 and 33 each spring having one end welded to the bottom 20 of the blade at points 34 and 35 respectively and each spring having its other end welded to the bottom member of the frame 11 at points 36 and 37 respectively. With this modification, as the blade is oscillated it can stabilize itself when driven with a suitable driving means, e.g. circular spinning eccentric weight motor 22, at the natural resonance frequency as determined by the mass of the blade and the spring constant.

In practicing the process of this invention, it is necessary that the pressure function nucleation promotion occur in the extrude prior to the time normal initiation of bubble formation or foaming starts. In the preparation of foamed polymers by extrusion, the extrude is in a metastable gel-like or plastic non-foamed state as it emerges from the die orifice. Within a short period of time after release from the pressure chamber of the extruder if the extrude is not rapidly cooled, equilibrium conditions tend to be established and the volatile foaming agent, e.g., methyl chloride, n-pentane, methyl ether, methyl ethyl ether, ethylene, propylene, butylene, butane, nitrogen, sulfur dioxide, sym-dichlorotetrafluorethane and the like, forms bubbles of a gaseous phase within the gel causing it to foam.

The existence time of this metastable gel-like phase can be varied, if desired, to insure proper nucleation of the bubble or cell sites in the extrude. With the more volatile foaming agents, e.g., methyl chloride, one way to accomplish this is to slightly reduce the gel extrusion temperature.. This temperature is controlled by means of a suitable heat exchange fluid passed through the jacketed cover of the conventional extruder die chamber. This lowered temperature will restrict the foaming until the pressure function can be applied to the extruded gel. Substitution of a less volatile foamer, e.g. methyl ethyl ether, which has a normal boiling point of 10.8° C., for the methyl chloride (normal boiling point −24.2° C.), also is an effective means of prolonging the stability or non-foamed condition of the extruded gel. To further illustrate, strands produced by extruding a mixture of polystyrene granules with n-pentane as foaming agent, if immediately subjected to a cold-water quench subsequent to extrusion gives a substantially stable non-foamed solid that can be stored indefinitely at room or sub-room temperatures in this non-foamed condition. While in this solid state, the strands may be set into natural oscillations by plucking them or by subjecting these to a hammering action to induce in these strands cyclic tension of such a degree that the yield point of the extrude is exceeded and mico-fractures are produced in the so-treated nonfoamed extrude. Subsequent heating of the so-treated extrude, to place it in a plastic condition and liberate bubbles of the n-pentane vapor, gives a foam of uniform small cell size.

Advantageously, it is desired in carrying out the pressure function process not to subject a given site on the extruded gel to more than one pressure function treatment.

A feature of the invention is that selectively foamed materials can be produced by this process. By selectively foamed material is meant a material containing a graded variation of cell sizes. The size and pattern of the cell structure in a given foam can be adjusted according to the invention by controlling the distribution of the effective energy of the pressure function applied to an extruded gel. As a specific embodiment, foamed materials having bands of fine cells alternating with bands of coarser cells can result from this process. This embodiment can be achieved by applying cyclic shock waves to an extrude at intervals thereby limiting the nucleation of fine cells to that portion of material receiving the shock wave. Furthermore, dots, crosses, and other intricate decorative and useful foam patterns can be formed in the material by suitably modifying the shape of the device by which the energy of the pressure function is applied to the extruded gel.

Furthermore, application of the process of this invention to foamable extrudes containing conventional nucleating agents results in foams having still smaller cells and better properties than the conventionally extruded nucleating agent containing foams themselves.

The following examples will serve to further illustrate the invention.

EXAMPLE 1

A conventional, foamable polystyrene blend of about 100 parts by weight of commericially available polystyrene granules, 12.5 parts methyl chloride and about 0.25 part barium stearate lubricant was fed in a conventional manner at a feed rate of about 200 pounds per hour into a 6 inch extruder. The mix was extruded at a velocity of about 18 feet per minute through a ⅛" x 4½" rectangular die at a die pressure of about 250 pounds per square inch. The long dimension of the die opening was horizontal. The resulting gel-like extrude was held to a temperature of about 95° C. as it emerged from the die orifice. Temperature control of the gel was maintained by passing a heat-exchange fluid through the jacketed cover of the extrusion die chamber. This gel, as it left the orifice, immediately was subjected to orderly cyclic force impacts from the vertical, rectilinear oscillator (about 8 cycles per second) attached to the exterior face of the die, the oscillator having a blade and anvil similar to that shown in FIGURES 1 and 2, opposite the die opening so that the extrude passed over the anvil beneath the blade as it moved toward and away from, but not touching, the anvil. The oscillator blade alternatively made and broke contact with the extruded gel as it flowed from the extruder die orifice. The so-treated gel as it moved away from the anvil and blade then spontaneously expanded into a polystyrene foam which cooled and hardened. The foamed product so obtained had a substantially uniform cell distribution which showed small deviation from the average, wherein the individual cells had an average diameter of about 0.4 millimeter. In a comparative run, conventional extrusion of a second sample of the above described polystyrene extrusion mixture, without subjecting the extrude gel to force impacts, gave a foam having a non-uniform distribution of cells ranging in size from about 4 to about 24 millimeters in diameter.

EXAMPLE 2

Using the same feed rate and extruder die opening as in Example 1, an extrusion mixture containing from 100 parts of polystyrene granules, about 11 parts of methyl chloride, about 0.25 part barium stearate lubricant and about 0.25 part of powdered hydrated calcium silicate nucleating agent was extruded at a die pressure of about 350 pounds per square inch. The gel-like extrude was held at a temperature of about 95.5° C. as it emerged from the die orifice. The extrude immediately was subjected to the same type of pressure function as used in Example 1. Subsequent expansion of the so-treated gel gave a foamed product having uniformly dispersed cells whose diameters ranged from about 0.05 to about 0.5 millimeter. This foam had a density of about 2.4 pounds per cubic foot, a compressive strength of about 78 pounds per square inch as measured vertical to the axis of flow from the extruder and a flex modulus of about 1740 pounds per square inch.

A second sample of this same mixture was extruded under the same conditions but without subjecting the extrude to the pressure function as above. The resulting foam had non-uniformly dispersed cells ranging in diameter from about 0.1 to about 1 millimeter in diameter. Commercial foams having approximately the same density as the instant nucleated product (about 2.4 pounds per cubic foot) have an average compressive strength of about 60 pounds per square inch and a flex modulus of about 1500 pounds per square inch.

EXAMPLE 3

A conventional extrusion blend of about 100 parts of commercially available polyethylene granules, about 10 parts sym-dichlorotetrafluoroethane, about 1 part zinc stearate, and 0.5 part of finely divided hydrated calcium silicate was fed into a 2½ inch extruder at a feed rate of 35 pounds per hour. The mix was extruded at a velocity of about 9 feet per minute through a ⅛ by ½ inch rectangular die orifice at a die pressure of about 600 pounds per square inch. The long dimension of the die opening was horizontal. The gel-like extrude had a temperature of about 98° C., at is emerged from the orifice of the extruder. The extrude then was passed between the open end of a hammer blade and anvil of a flexing plate oscillator vibrating toward and away from, and not touching the anvil, at about 50 cycles per second. In this device, the flexually oscillating hammer is mounted near its midpoint to a fixed fulcrum point and is driven into oscillations by an eccentric weight motor mounted onto the blade at the end opposite that which contacts the gel. The so-treated gel upon subsequent foaming gave a cellular product having a cell size range of about 0.2 to about 0.5 millimeter diameter. A control test run under conditions similar to that above, but eliminating the vibratory impacts gave a foam having an average cell size diameter of about 1.2 millimeter and showing a broader cell size range than the shock nucleated foam.

EXAMPLE 4

A conventional extrusion blend of about 100 parts of polystyrene granules, about 10 parts of methyl chloride and about 0.25 part barium stearate die lubricant was fed into a 2½ inch extruder at a feed rate of about 30 pounds per hour. The mix was extruded at a velocity of about 10 feet per minute through a ⅛ by ½ inch rectangular die orifice at a die pressure of about 600 pounds per square inch, the long dimension of the die orifice being horizontal. The gel-like extrude had a temperature of about 98° C. as it emerged from the orifice of the extruder. The extrude then was passed between the hammer and anvil of a flexing plate oscillator vibrating toward and away from, but not touching, the anvil at about 50 cycles per second. A number of runs were made evaluating the effect of varying the minimum close distance between the anvil and hammer, equivalent to varying the total pressure function impacts, upon the cell size diameter of the foamed product. In carrying out these tests, the hammer and anvil were adjusted in an air medium so as to achieve a measured minimum close opening between these members during operation. Having established this distance, extrude gel was passed between the hammer and anvil and subjected to oscillating pressure function impacts as described above. The so-treated gel as it moved away from the extruder then foamed, cooled and hardened. The results of a series of tests evaluating impact force on cell size are presented in Table I which follows:

*Table I*

| Flexing Plate Oscillator (Minimum Opening Between Open Ends of Hammer and Anvil at Close Position), Inches | Foamed Extrude Cell Size (Millimeters) | | | Remarks |
| --- | --- | --- | --- | --- |
| | Min. | Max. | Av. | |
| 0 | 0.1 | 0.8 | 0.5 | Open ends of Anvil and hammer made contact at close position in air, but did not touch when gel was forced between them. |
| 0.0625 (¹⁄₁₆) | 0.3 | 0.9 | 0.5 | |
| 0.09375 (³⁄₃₂) | 0.3 | 0.8 | 0.5 | |
| 0.125 (⅛) | 1.0 | 3.0 | 1.5 | Hammer barely made contact with gel surface. |
| Control | 4 | 8 | 6 | No force impacts upon gel. |

EXAMPLE 5

A mixture of polystyrene granules (about 100 parts) and n-pentane (about 6 parts) was extruded in a conventional manner at a die extrusion pressure of about 1000 pounds per square inch through a strand die containing about 250 ¹⁄₁₆ inch holes. The resulting gel-like extrude strands which were at a temperature of about 135° C., were immediately pulled through a water bath maintained at about 50–100° Fahrenheit. This quench produced a protective coating on each solid strand, thereby effecting sealing in the n-pentane and reducing markedly tendencies towards vapor loss when the extruded strands were stored at room temperature or lower. The resulting strands were subjected at room temperature to cyclic tensions exceeding the yield point of the extruded polystyrene to introduce micro-fractures into the extrude. The strands were excited into cyclic tension by subjecting these to a high speed pinching-pulling action by passing the strands over a rapidly rotating elliptical shaft. Strands then were placed in a steam bath, achieving a temperature of about 100° C., whereupon they expanded into a substantially uniform fine-celled foam having cell diameters averaging about 0.1 millimeter.

A second portion of the stressed, unfoamed extrude was stored in a sealed, vapor-proof container at room temperature for about a week. After this period of time, the container was opened, the unfoamed extrude removed and this material heated from about 90 to about 110° C. by infrared lamps. A foamed product resulted which had substantially the same cell size and narrow cell size range as was obtained with the first sample of material.

Extruding, water cooling and subsequently reheating in a steam bath of a similar batch of polystyrene material in a conventional manner without cyclic tension treatment gave expanded foamed strands of smaller diameter than the treated material. The conventionally prepared foamed strands also had larger diameter cells.

It is understood that introduction of orderly, repetitive shock impacts or cyclic pressure functions into a foamable extrude to produce cell or bubble nucleation therein is not limited to the peculiar oscillator shown herein by way of illustration, but rather any one of a variety of means can be used to produce the mechanically induced stress or the pressure function as applied to the extrude. For example, the impact pressure function generating device can be circular, elliptical, or of diverse shape adaptable for use with a wide variety of extrusion die designs. These stress inducing devices can be designed to operate electromagnetically, magnetostrictively or be mechanically excited to induce the necessary cyclic shock wave pressure functions in the gel-like extrude. Alternatively, flexing plate-type oscillators can be inserted directly into the gel as it is extruded to impart cyclic tension thereupon. Other means of imparting the necessary nucleating pressure function to the extrude, as recognized by one skilled in the art, can be used to carry out the present process. Furthermore, it is understood that the process of this invention is applicable for use with any of the extrusion techniques used in producing foams from such thermoplastic polymers. In a manner similar to the foregoing, selective nucleation can be induced into extruded foamable compositions of other resinous benzene-soluble monovinyl aromatic polymers and copolymers, foamable polypropylene compositions, foamable compositions containing mixtures of polyethylene and polypropylene, foamable metal compositions and foamable glass compositions by inducing tensile stress into the corresponding extrude prior to the initiation of foaming therein.

Various modifications can be made in the present invention without departing from the spirit or scope thereof, for it is understood that I limit myself only as defined in the appended claims.

I claim:

1. In a process for the production of small-celled extruded foamed polystyrene the improvement of which comprises; subjecting an extrude of polystyrene and a foaming agent to the action of cyclic shock waves prior to initiation of normal foaming, said shock waves ranging in frequency from subsonic to ultrasonic frequencies and said shock waves initiating a multiplicity of cell nucleation sites in said extrude and said foaming agent being a member selected from the group consisting of methyl chloride, n-pentane, methyl ether, methyl ethyl ether, ethylene, propylene, butylene, butane, nitrogen, sulfur dioxide and sym-dichlorotetrafluoroethane.

2. In a process for the production of small-celled extruded foamed polyethylene the improvement of which comprises; subjecting an extrude of polyethylene and a foaming agent to the action of cyclic shock waves, prior to initiation of foaming, said shock waves initiating a multiplicity of cell nucleation sites in said extrude, and foaming the shock treated extrude in a conventional manner.

3. A process for the production of small-celled extruded foamed polyethylene which comprises; extruding a mixture containing about 100 parts polyethylene and from about 5 to about 15 parts sym-dichlorotetrafluoroethane in a conventional manner, applying to the extrude prior to the initiation of foaming repetitive force impacts, permitting the so-impacted extrude to move away from the site of the force impacts, and, expanding said extrude into a polyethylene foam.

4. The process as defined in claim 7 wherein the foam cell cavitation sites are produced in predetermined portions of said extrude.

5. The process as defined in claim 10 wherein the repetitive cyclic shock waves range in frequency from about 8 to about 50 cycles per second.

6. A process for the production of foamed polystyrene which comprises extruding a heated gel-like mixture containing about 100 parts polystyrene and from about 5 to about 15 parts n-pentane, applying a water quench to the extrude prior to the initiation of foaming therein, said water quench having a maximum temperature of about 100° F., repetitively striking the quenched extrude with force impacts thereby producing microfractures in said quenched extrude, said force impacts ranging in frequency from low subsonic to high ultrasonic frequencies, heating the so-treated extrude to a temperature of from about 90° C. to about 120° C. and, permitting the so-heated extrude to expand into a polystyrene foam.

7. In a process for producing a foamed polymer wherein the polymeric material is a member selected from the group consisting of polystyrene, polyethylene and polypropylene the improvement which comprises striking a foamable extruded gel of said polymeric material with cyclic force impacts prior to the initiation of foaming therein thereby subjecting said gel to a tensile stress and nucleating foam cell cavitation sites therein, said cyclic impacts ranging in frequency from low frequency subsonic impulses to high frequency ultrasonic impulses.

8. In a process for producing foams from a composition containing a polymeric material selected from the group consisting of polystyrene, polyethylene and polypropylene and a foaming agent selected from the group consisting of methyl chloride, n-pentane, methyl ether, methyl ethyl ether, ethylene, propylene, butylene, butane, nitrogen, sulfur dioxide and sym-dichlorotetrafluoroethane wherein said composition is heated within a closed chamber at an elevated temperature and pressure thereby rendering said composition thermoplastic and is released from said chamber as a gel the improvement which comprises; repeatedly striking the so-released gel prior to the initiation of foaming therein with cyclic force impacts thereby generating a multiplicity of cell nucleation sites in said gel, said force impacts ranging from subsonic to ultrasonic in frequency and, expanding the so-treated gel into a foam.

9. In a process for producing foams from a mixture of a foamable organic polymer selected from the group consisting of polystyrene, polyethylene and polypropylene and a foaming agent, said foaming agent being a volatile organic liquid inert to said polymer and having a normal boiling point between about 10° C. and about 36° C. the improvement which comprises; quenching and maintaining a gel extrude of said polymer at a temperature below the boiling point of said foaming agent thereby hardening said extrude and entrapping the volatile foaming agent therein, striking said quenched extrude with repetitive force impacts thereby producing microfractures therein, said force impacts ranging in frequency from low subsonic to high ultrasonic frequencies, heating the so-struck polymer thereby rendering it plastic and whereby the foaming agent vaporizes, expanding the plastic polymer into a foam, and cooling said foam below the thermoplastic temperature of said polymer.

10. A process for the production of small-celled extruded foamed polystyrene which comprises; extruding a mixture containing about 100 parts polystyrene and from about 5 to about 15 parts methyl chloride in a conventional manner, applying cyclic shock waves to the extrude prior to initiation of foaming of said extrude, said shock waves initiating a multiplicity of cell nucleation sites in said extrude, permitting the so-treated extrude to move away from the site of the cyclic shock waves, and, expanding said extrude into a polystyrene foam.

No references cited.